United States Patent
Tao et al.

(10) Patent No.: US 10,139,818 B2
(45) Date of Patent: Nov. 27, 2018

(54) VISUAL COMMUNICATION SYSTEM FOR AUTONOMOUS DRIVING VEHICLES (ADV)

(71) Applicant: Baidu USA LLC, Sunnyvale, CA (US)

(72) Inventors: Jiaming Tao, Sunnyvale, CA (US); Jiangtao Hu, Sunnyvale, CA (US); Yifei Jiang, Sunnyvale, CA (US); Dong Li, Sunnyvale, CA (US); Liyun Li, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 80 days.

(21) Appl. No.: 15/353,121

(22) Filed: Nov. 16, 2016

(65) Prior Publication Data

US 2018/0136643 A1    May 17, 2018

(51) Int. Cl.
| | |
|---|---|
| G05D 1/00 | (2006.01) |
| G05D 1/02 | (2006.01) |
| B60Q 1/14 | (2006.01) |
| H04B 10/116 | (2013.01) |

(52) U.S. Cl.
CPC .......... *G05D 1/0022* (2013.01); *B60Q 1/143* (2013.01); *G05D 1/0088* (2013.01); *G05D 1/0231* (2013.01); *H04B 10/116* (2013.01)

(58) Field of Classification Search
CPC ... G05D 1/0022; G05D 1/0088; G05D 1/0231
See application file for complete search history.

(56) References Cited

U.S. PATENT DOCUMENTS

| | | | |
|---|---|---|---|
| 9,694,813 B2* | 7/2017 | Toyoda | B60W 30/09 |
| 9,855,890 B2* | 1/2018 | James | B60Q 1/503 |
| 9,868,332 B2* | 1/2018 | Anderson | B60G 17/016 |
| 2016/0176398 A1* | 6/2016 | Prokhorov | B60W 30/09 701/23 |
| 2017/0057496 A1* | 3/2017 | Toyoda | B60W 30/09 |
| 2017/0057514 A1* | 3/2017 | Toyoda | B60W 30/18154 |

(Continued)

OTHER PUBLICATIONS

Michaud et al., Coordinated Maneuvering of Automated Vehicles in Platoons, 2006, IEEE, p. 437-447 (Year: 2006).*

(Continued)

*Primary Examiner* — McDieunel Marc
(74) *Attorney, Agent, or Firm* — Womble Bond Dickinson (US) LLP (57) ABSTRACT

Described is a system that provides the ability for an autonomous driving vehicle to visually communicate with other traffic entities such as other autonomous driving vehicles, non-autonomous driving vehicles, pedestrians, cyclists, and the like. To provide such an ability, the system allows autonomous driving vehicles to communicate using a lighting mechanism. For example, the lighting mechanism may include one or more specialized lights that are provided in addition to any mandated lighting systems required for a vehicle (e.g. brake lights, headlights, turn signals, etc.). Accordingly, the autonomous driving vehicle may communicate with traffic entities to provide additional cues such as intended driving maneuvers, and to provide a mechanism for two-way communication with other autonomous driving vehicles.

20 Claims, 8 Drawing Sheets

(56) References Cited

U.S. PATENT DOCUMENTS

2017/0361853 A1* 12/2017 Nagy ................... B60W 50/14
2018/0032082 A1*  2/2018 Shalev-Shwartz ..........................
                                                G05D 1/0221

OTHER PUBLICATIONS

Maurer et al., A system architecture for autonomous visual road vehicle guidance,1998, IEEE, p. 578-583 (Year: 1998).*

Rwald et al., Cooperation of autonomous vehicles using a hierarchy of auction-based and model-predictive control, 2016, IEEE, p. 1078-1048 (Year: 2016).*

Baber et al., Cooperative autonomous driving: intelligent vehicles sharing city roads, 2005, IEEE, p. 44-49 (Year: 2005).*

Rwald, Cooperation of Autonomous Vehicles Using a Hierarchy of Auction-based and Model-Predictive Control , 2016, IEEE, p. 1078-1084 (Year: 2016).*

* cited by examiner

VISUAL COMMUNICATION SYSTEM FOR AUTONOMOUS DRIVING VEHICLES (ADV)

TECHNICAL FIELD

Embodiments of the present disclosure relate generally to operating autonomous vehicles. More particularly, embodiments of the disclosure relate to providing a visual communication system for autonomous driving vehicles.

BACKGROUND

Vehicles operating in an autonomous mode (e.g., driverless) can relieve the driver from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A vehicle operating in an autonomous mode may encounter other autonomous driving vehicles. Accordingly, each autonomous driving vehicle may require planning and control based on potential driving maneuvers performed by another autonomous driving vehicle. For example, human motorists (e.g. drivers, cyclists, pedestrians, etc.) may communicate using various social interactions (e.g. hand signals, car horns, etc.). With autonomous driving vehicles, however, a driver may be a passive participant in driving-related responsibilities, and therefore, not active during vehicle operation. Moreover, because social interactions are not standardized, an autonomous driving vehicle attempting to interpret social interactions of other motorists by may be problematic. Accordingly, there is a need for a reliable communication system that may be used by autonomous driving vehicles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

According to some embodiments, described is a system (and method) that provides the ability for an autonomous driving vehicle to visually communicate with other traffic entities such as other autonomous driving vehicles, non-autonomous driving vehicles, pedestrians, cyclists, and the like. In one embodiment, the system allows autonomous driving vehicles to communicate using a lighting mechanism. In one embodiment, the lighting mechanism may include one or more specialized lights that are provided in addition to any mandated lighting systems required for a vehicle (e.g. brake lights, headlights, turn signals, etc.). Accordingly, visual communications may act as a notification system as well as a two-way communication with other autonomous driving vehicles Accordingly, in one aspect, the system may act as a one-way notification mechanism. For example, the visual communication signal may notify traffic entities of an intended driving maneuver. For example, a visual communication signal may indicate that the autonomous driving vehicle may perform an abrupt action such as an immediate turn or an aggressive braking that may not otherwise be provided with mandated lighting systems (e.g. brake lights, turn signals, etc.). In other words, in such an example, the visual communication signal may supplement a mandated lighting system and provide additional information (e.g. indication of abruptness or a severity of an action).

In another example, the visual communication signal may provide an indication that the autonomous driving vehicle may commence movement (e.g. accelerate) from a stopped position. Accordingly, other vehicles, cyclists, or pedestrians may anticipate such a maneuver, which provides an additional communication that is not currently available using mandated lighting systems.

In another aspect, the visual communication may be part of a two-way notification mechanism. For example, a first autonomous driving vehicle may provide a first visual communication signal that notifies other autonomous driving vehicles of an intended driving maneuver. Accordingly, a second autonomous driving vehicles may provide a second visual communication signal in response to the first visual communication signal. For example, the second visual communication signal may indicate an intended driving maneuver for the second autonomous driving vehicle. Thus, the first and second autonomous driving vehicles may reactively modify their respective maneuvers if necessary.

In yet another aspect, the visual communication signals may be part of a two-way communication protocol between autonomous driving vehicles. For example, the visual communication signal may be part of a protocol that includes queries, acknowledgments, confirmations, etc. For example, a first (or initial) visual communication signal from a first autonomous driving vehicle may act as a query and a second visual communication signal from a second autonomous driving vehicle may act as an acknowledgement. For instance, the acknowledgement may indicate that the second autonomous driving vehicle has received the first visual communication signal and/or is in fact capable of communicating via a visual communication protocol. Accordingly, the autonomous driving vehicles can proceed reactively in response to the acknowledgement.

Figure 1:
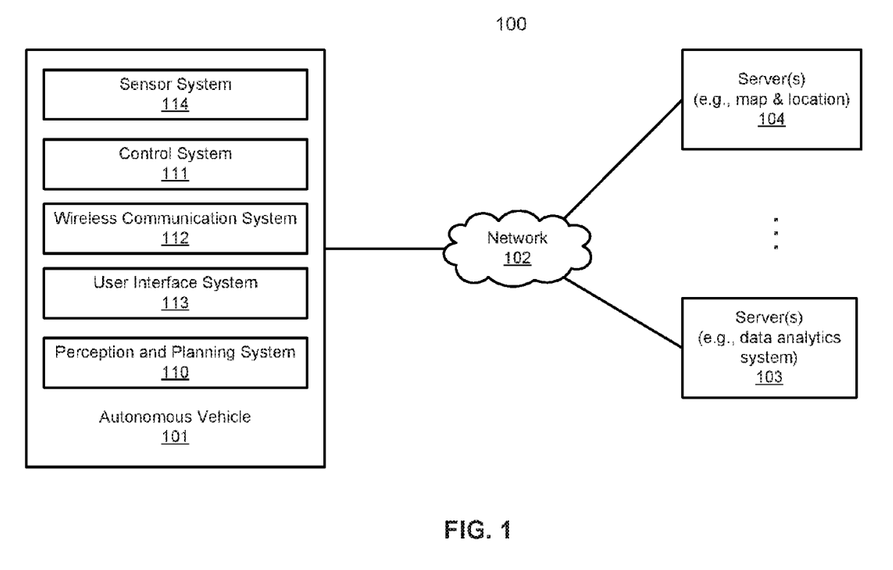
FIG. 1 is a block diagram illustrating an autonomous vehicle network configuration according to one embodiment of the disclosure

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
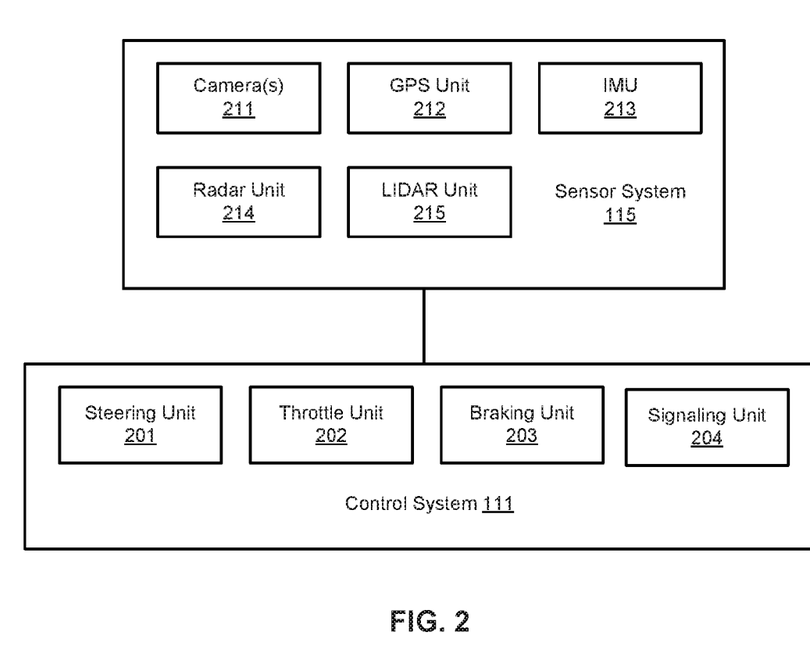
FIG. 2 is a block diagram illustrating an example of a sensor and control system according to one embodiment of the disclosure.

FIG. 2 is a block diagram illustrating an example of a sensor and control system according to one embodiment of the disclosure. In one embodiment, sensor system 114 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform. In one embodiment, one or more cameras 211 may detect visual communications as described herein).

Sensor system 114 may further include other sensors, such as, a lighting sensor (to detect visual communications as described herein), a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, and signaling unit 204. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Accordingly, a driving maneuver may include any driving actions performed by the autonomous vehicle 101, for example, by using one, or a combination, of the steering unit 201, throttle unit 202, and braking unit 203.

Signaling unit 204 may provide the visual communication signals. In one embodiment, the visual communication signals may be a lighting mechanism. Accordingly, the signaling unit 204 may control any suitable lights (e.g. LED lights) for providing a notification in visual form to other traffic entities including other autonomous driving vehicles, drivers, cyclists, pedestrians, etc. The visual communication signal may be in any suitable form such as a particular pattern, strobe, frequency, color, intensity, direction, etc. In addition, in embodiments where the visual communication acts as a notification to human entities (e.g. human drivers, cyclists, pedestrians, etc.), the form of the visual communication would be human perceptible. In embodiments where the communication is used only for a communication between autonomous driving vehicles (e.g. two-way communication protocol), the visual communication may not necessarily need to be human-perceptible. For example, the lighting mechanism may employ a strobe frequency not perceptible to humans but is distinguishable by other autonomous driving vehicles. In one embodiment, the lighting (or signaling) mechanism may be separate from any mandated lighting systems required for a vehicle (e.g. brake lights, headlights, turn signals, etc.). For example, one or more lights forming the lighting mechanisms may be positioned in any suitable location of the vehicle (e.g., front, top, rear, lower body panels, etc.). In another embodiment, the lighting mechanism may be part of, or work in conjunction with, a mandated lighting system. For example, the lighting mechanism may be provided as part of a headlight unit of a vehicle. For instance, the lighting mechanism may use the headlight (e.g. headlamp), or may use a separate light. In instances where the lighting mechanism uses the headlight, it may increase the intensity, color, or other characteristics of the headlight to act as a visual communication mechanism. It should be noted that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 114 (e.g., obstacles, objects, nearby vehicles), perception and planning system 110 can plan an optimal route and drive vehicle 101, for example, via control system 111, according to the planned route to reach the specified destination safely and efficiently.

Figure 3:
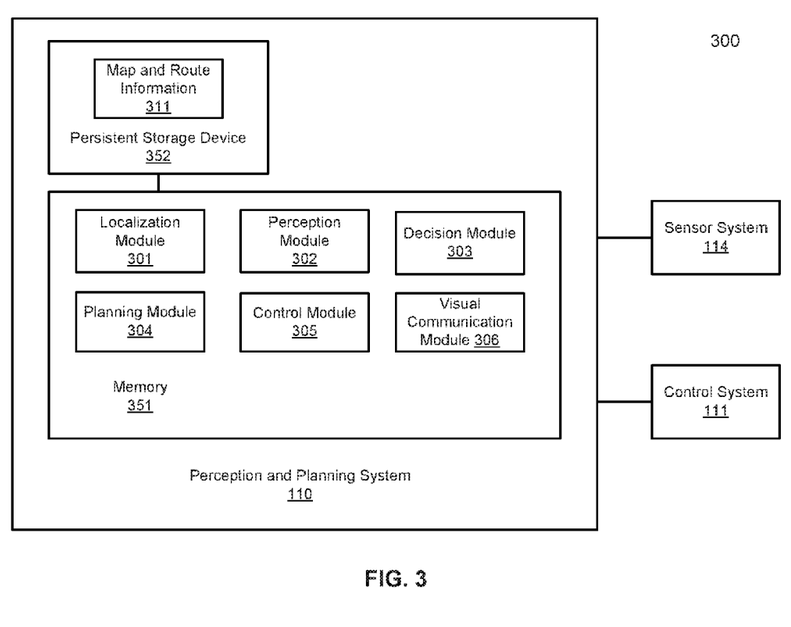
FIG. 3 is a block diagram illustrating an example of a perception and planning system used with an autonomous driving vehicle according to one embodiment of the disclosure.

FIG. 3 is a block diagram illustrating an example of a perception and planning system used with an autonomous vehicle according to one embodiment of the disclosure. System 300 may be implemented as a part of autonomous vehicle 101 of FIG. 1 including, but is not limited to, perception and planning system 110, control system 111, and sensor system 114. The perception and planning system 110 includes, but is not limited to, localization module 301, perception module 302, decision module 303, planning module 304, control module 305, and visual communication module 306

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. In addition, the perception module 302 may also detect human social interactions such as hand gestures and signals that may be provided by traffic entities associated with a human (e.g. cyclists, pedestrians, etc.)

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Visual communication module 306 may initiate visual communications that are provided by the autonomous driving vehicle 101 and process received visual communication signals from other vehicles. For example, based on an intended driving parameter determined by the decision module 303/planning module 304, the visual communication module 306 may determine an appropriate visual communication signal. In addition, the communication module 306 may detect one or more received visual communications signals. In one embodiment, a type of visual communication signal may be identified (e.g. acknowledgement, driving maneuver, confirmation, etc.). For example, based on a received visual communication signal, a decision module 303 may update an intended (or subsequent) driving maneuver for the autonomous driving vehicle 101 as further described herein.

In should be noted that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
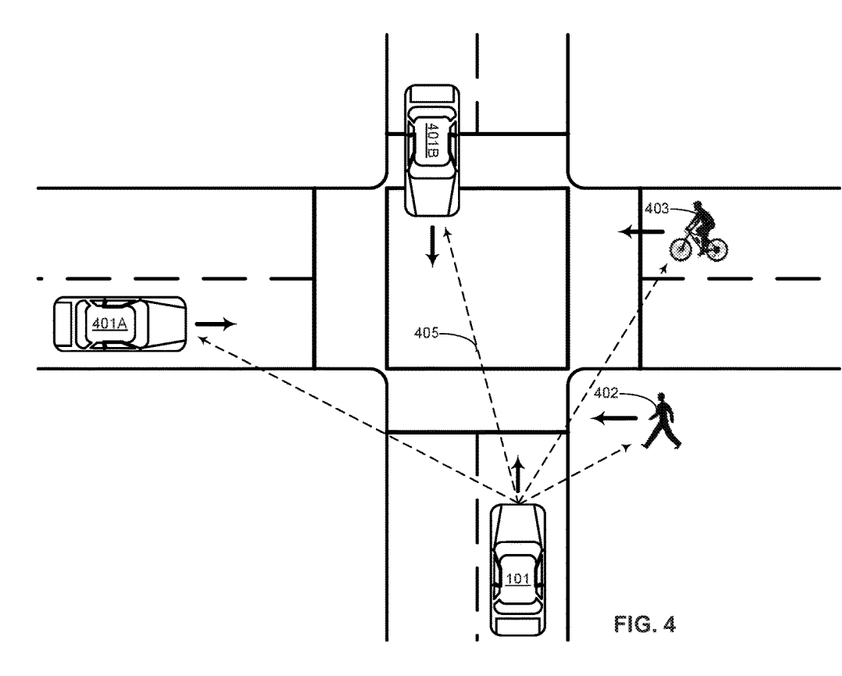
FIG. 4 is an example diagram illustrating an autonomous driving vehicle providing a one-way visual communication signal to other traffic entities according to an embodiment of the disclosure.

FIG. 4 is an example diagram illustrating an autonomous driving vehicle providing a one-way visual communication as a notification to other traffic entities according to an embodiment of the disclosure. As shown, autonomous driving vehicle 101 (e.g. a first autonomous driving vehicle) may provide a visual communication signal 405 as described above. In one embodiment, the visual communication signal 405 may be provided in response to perceiving one or more vehicles (e.g. vehicles 401A and 401B, cyclist 403, or pedestrian 402). Accordingly, the visual communication signal 405 may be detected by these other traffic entities including vehicles (401A and 401B), as well as cyclists 403 and pedestrians 402. Accordingly, the other traffic entities may be notified of an intended driving maneuver of the autonomous driving vehicle 101 as described above.

Figure 5:
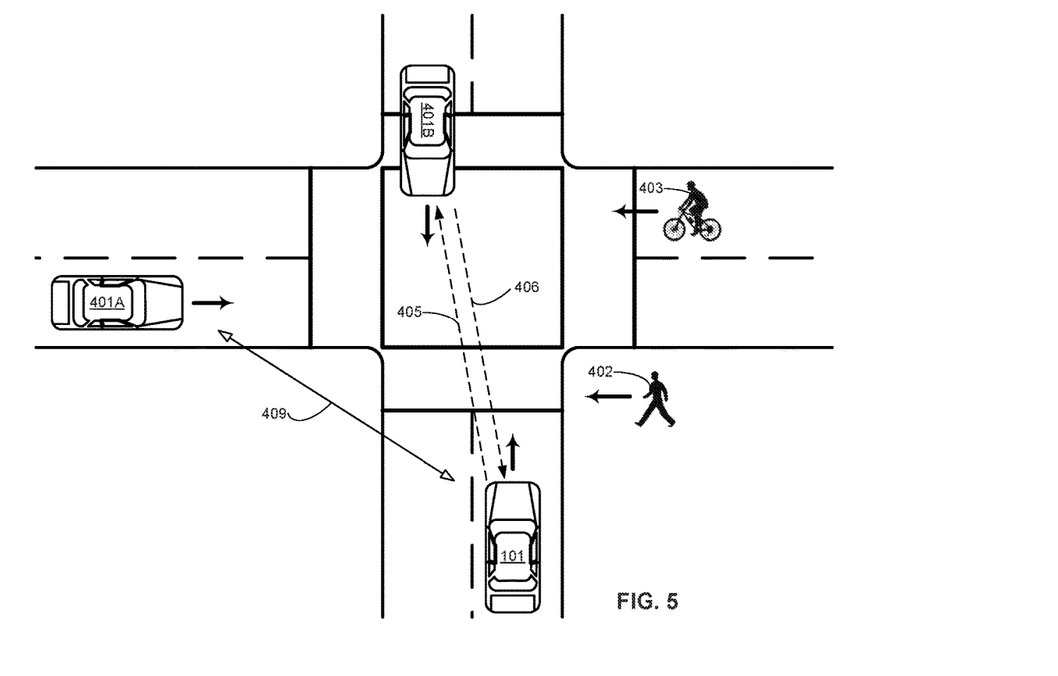
FIG. 5 is an example diagram illustrating autonomous driving vehicles providing two-way visual communication signals according to an embodiment of the disclosure.

FIG. 5 is an example diagram illustrating autonomous driving vehicles providing two-way visual communication signals according to an embodiment of the disclosure. As shown, autonomous driving vehicle 101 (e.g. a first autonomous driving vehicle) may provide a first visual communication signal 405 as described with respect to FIG. 4. In one embodiment, another autonomous driving vehicle (e.g. vehicle 401B) may provide a second visual communication signal 406 as a response to a first visual communication signal 405. For example, the second communication signal 406 may provide an indication of a driving maneuver intended to be performed by autonomous driving vehicle 401B (e.g. a second autonomous driving vehicle). For instance, the indication may provide a notification that autonomous driving vehicle 401B intends to continue through the intersection. Accordingly, the autonomous driving vehicle 101 may determine a subsequent driving maneuver. For instance, autonomous driving vehicle 101 may delay making a left turn in anticipation of vehicle 401B proceeding through the intersection.

In addition, in one embodiment, a two-way communication protocol 409 may be established between autonomous driving vehicle 101 and autonomous driving vehicle 401A. For example, an initial visual communication signal from autonomous driving vehicle 101 may act as a query and a subsequent visual communication signal from autonomous driving vehicle 401A may act as an acknowledgement. For example, in one embodiment, the acknowledgment may provide an indication that a second autonomous vehicle is aware of the intended driving maneuver of the first autonomous driving vehicle, and accordingly, the first vehicle may proceed with the intended maneuver. In addition, the acknowledgement may establish that the other vehicle may communicate using a particular protocol (e.g. act as a handshake mechanism). Once a protocol has been established, the autonomous driving vehicles may proceed with further communications. For example, communications between vehicles may indicate which vehicle has the right of way during a 4-way stop as shown. For instance, each vehicle may forecast the intended driving maneuver (e.g. proceed straight, left turn, right turn, etc.) prior to reaching a stop, and accordingly, each vehicle may proceed from the 4-way stop in an efficient manner (e.g. rapidly) after coming to a full stop as the intended maneuvers after stopping of the other vehicles are already known.

Figure 6:
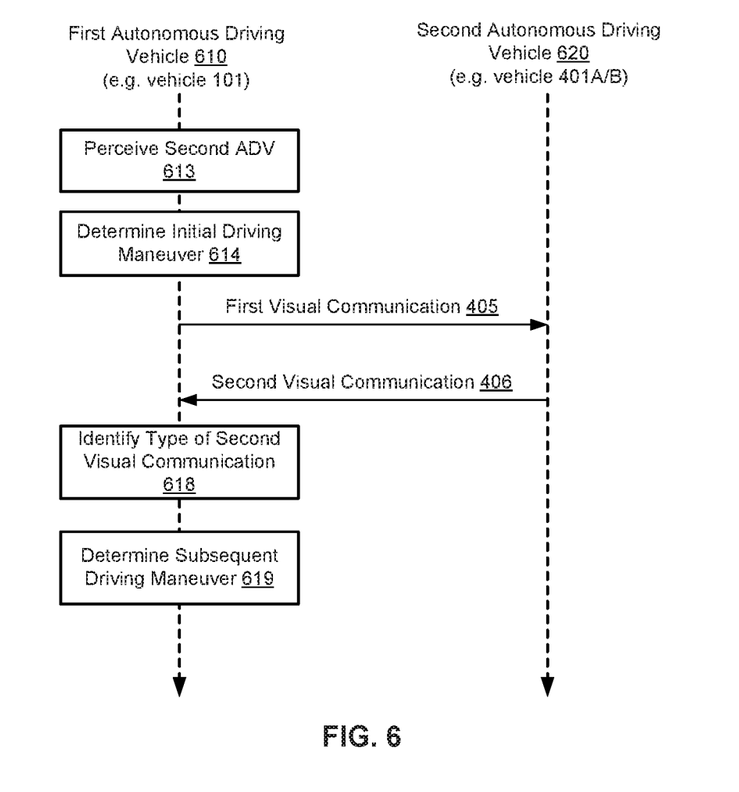
FIG. 6 is an example process flow of providing a visual communication between autonomous driving vehicles according to an embodiment of the disclosure.

FIG. 6 is an example process flow of providing a visual communication between autonomous driving vehicles according to an embodiment of the disclosure. As shown, in 613, a first autonomous driving vehicle 610 may perceive a second autonomous driving vehicle 620. In 614, the first autonomous driving vehicle 610 may determine an initial driving maneuver. Accordingly, a first visual communication signal 405 may be provided by the first autonomous driving vehicle 610 as described above. In response, a second visual communication signal 406 may be provided by the second autonomous driving vehicle 620. For example, the second visual communication signal may be an acknowledgement, an intended driving maneuver by the second autonomous driving vehicle, or both. In 618, the first autonomous driving vehicle 610 may identify the type of communication represented by the second visual communication. Accordingly, in 619, the first autonomous driving vehicle may determine a subsequent driving maneuver. For example, the first autonomous driving vehicle may modify the initial driving maneuver based on an intended driving maneuver of the second autonomous driving vehicle. For instance, if the second autonomous driving vehicle does not acknowledge the first visual signal, or provides an intended driving maneuver that may conflict the with the intended driving maneuver of the first autonomous driving vehicle, the first autonomous driving vehicle may modify the initial driving maneuver.

Figure 7:
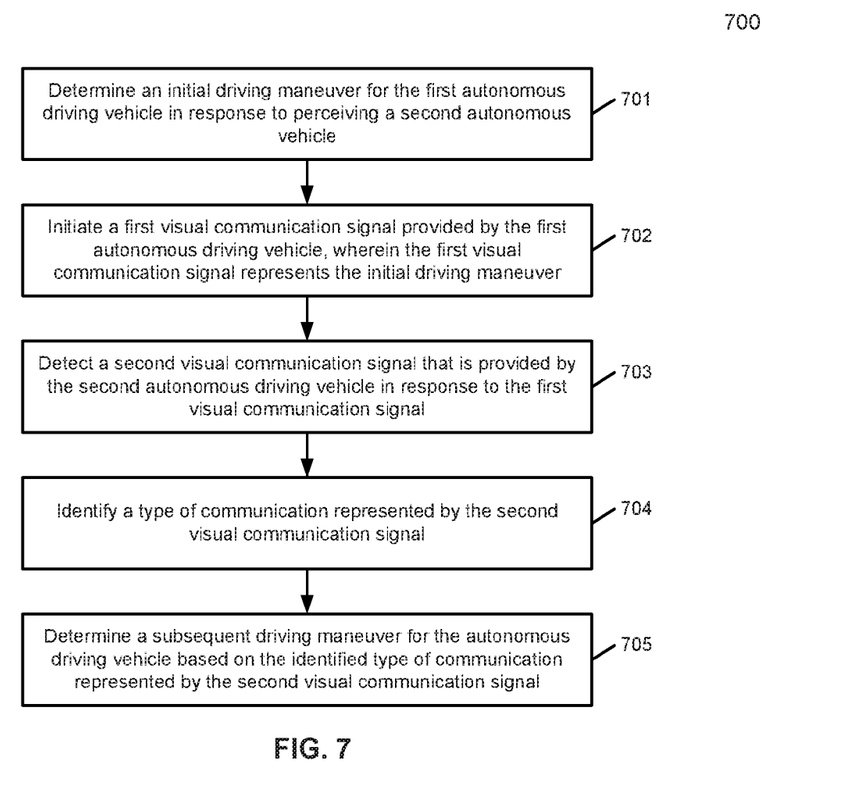
FIG. 7 is an example flow diagram illustrating a method of an autonomous driving vehicle providing visual communication signals according to an embodiment of the disclosure.

FIG. 7 is an example flow diagram illustrating a method of an autonomous driving vehicle providing visual communication signals according to an embodiment of the disclosure. Process 700 may use processing logic that may include software, hardware, or a combination thereof. For example, process 700 may be performed by a system (e.g. systems 100 or 300), or a computing device or device.

In 701, the system may determine an initial driving maneuver for the first autonomous driving vehicle (e.g. vehicle 101) in response to the first autonomous driving vehicle perceiving a second vehicle (e.g. vehicle 401A/B, cyclist 403, pedestrian 402, etc.).

In 702, the system may initiate a first visual communication signal provided by the first autonomous driving vehicle. In one embodiment, the first visual communication signal (e.g. visual communication signal 405) represents the proposed driving maneuver.

In 703, the system may detect a second visual communication signal provided by the second vehicle (e.g. visual communication signal 406) in response to the first visual communication signal. In one embodiment, the first and second visual communication signals maybe provided by a lighting mechanism of the first and second driving vehicles respectively.

In 704, the system may identify a type of communication represented by the second visual communication signal. For example, the identified type of communication represented by the second visual communication signal may be a driving maneuver for the second autonomous driving vehicle, an acknowledgement of the a driving maneuver of the first vehicle, or both.

In 705, the system may determine a subsequent driving maneuver for the first autonomous driving vehicle based on the identified type of communication represented by the second visual communication signal. For example, the subsequent driving maneuver for the first autonomous driving vehicle may include modifying the initial driving maneuver, for example, when the second visual communication signal represents a potentially conflicting maneuver. In another example, the subsequent driving maneuver for the first autonomous driving vehicle may conform to the initial driving maneuver, for example, when the second visual communication signal represents an acknowledgement (or confirmation) of the first visual communication signal. Accordingly, when the identified type of communication represented by the second visual communication signal is an acknowledgement of the first visual communication signal, determining the subsequent driving maneuver may include maintaining the initial driving maneuver for the first autonomous driving vehicle.

In one embodiment, the system may initiate, in response to the second visual communication signal being identified as an acknowledgement, a third visual communication signal provided by the first autonomous driving vehicle. For example, the third visual communication signal may represent a confirmation that the subsequent driving maneuver will conform to the initial driving maneuver. In one embodiment, the third visual communication signal may update a decision system that provides driving control for the second autonomous driving vehicle.

In one embodiment, determining the subsequent driving maneuver for the first autonomous driving vehicle may including updating a probability for a decision system (e.g. system 110) used for providing the autonomous driving control. For example, updating the probability may be based on the identified type of communication represented by the second visual communication signal.

Figure 8:
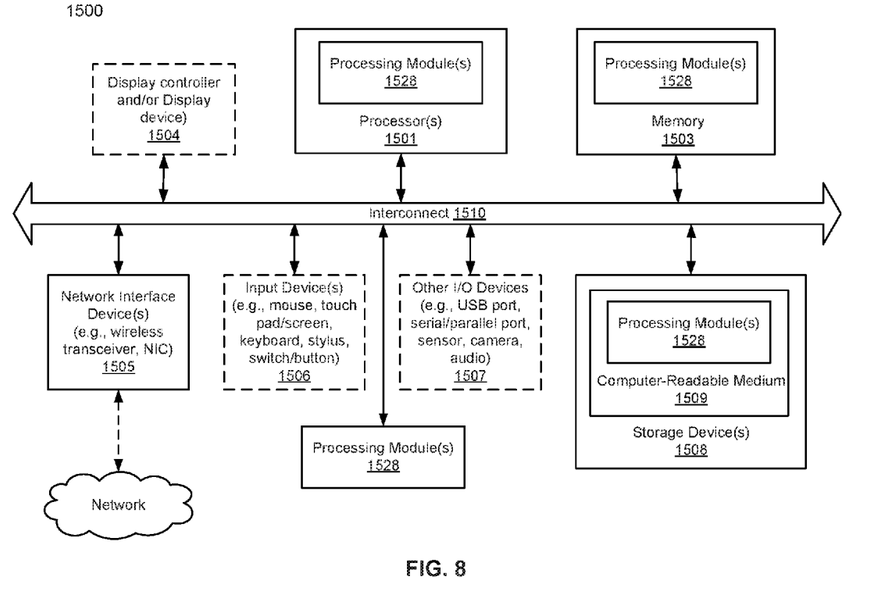
FIG. 8 is a block diagram illustrating an example computing system that may be used in conjunction with one or more embodiments of the disclosure.

FIG. 8 is a block diagram illustrating an example computing system that may be used in conjunction with one or more embodiments of the disclosure.

For example, system 1500 may represent any of data processing systems described above performing any of the processes or methods described above, such as, for example, one or more components 110-114 of the autonomous vehicle 101, or servers 103-104 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., component, module, unit, and/or logic 1528) embodying any one or more of the methodologies or functions described herein.

Component/module/unit/logic (e.g. processing modules) 1528 may represent any of the components described above, such as, for example, decision system 110, sensor system 114, and control system 111 (and related modules and sub-modules). Component/module/unit/logic 1528 may also reside, completely or at least partially, within memory 1503 and/or within processor 1501 during execution thereof by data processing system 1500, memory 1503 and processor 1501 also constituting machine-accessible storage media. In addition, component/module/unit/logic 1528 can be implemented as firmware or functional circuitry within hardware devices. Further, component/module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of providing autonomous driving control for a first autonomous vehicle, comprising:
   determining an initial driving maneuver for the first autonomous driving vehicle in response to the first autonomous driving vehicle perceiving a second vehicle;
   initiating a first visual communication signal provided by the first autonomous driving vehicle, wherein the first visual communication signal represents the initial driving maneuver;
   detecting a second visual communication signal that is provided by the second vehicle in response to the first visual communication signal, including emitting light according to a predetermined lighting pattern using a lighting mechanism mounted on the second vehicle in response to the first visual communication signal, the predetermined lighting pattern representing the second visual communication signal;
   identifying a type of communication represented by the second visual communication signal based on the predetermined lighting pattern; and
   determining a subsequent driving maneuver for the first autonomous driving vehicle based on the identified type of communication represented by the second visual communication signal.

2. The method of claim 1, wherein the first and second visual communication signals are provided by a lighting mechanism of the first and second vehicles respectively.

3. The method of claim 1, wherein the identified type of communication represented by the second visual communication signal is a driving maneuver for the second vehicle, wherein the second vehicle is a second autonomous driving vehicle.

4. The method of claim 3, wherein determining the subsequent driving maneuver for the first autonomous driving vehicle includes modifying the initial driving maneuver.

5. The method of claim 1, wherein the identified type of communication represented by the second visual communication signal is an acknowledgement of the first visual communication signal.

6. The method of claim 5, wherein determining the subsequent driving maneuver for the first autonomous driving vehicle includes maintaining the initial driving maneuver for the first autonomous driving vehicle.

7. The method of claim 5, further comprising initiating, in response to the second visual communication signal being identified as an acknowledgement, a third visual communication signal provided by the first autonomous driving vehicle, wherein the third visual communication signal represents a confirmation that the subsequent driving maneuver will conform to the initial driving maneuver.

8. The method of claim 7, wherein the third visual communication signal updates a decision system that provides driving control for the second vehicle, wherein the second vehicle is a second autonomous driving vehicle.

9. The method of claim 1, wherein determining the subsequent driving maneuver for the first autonomous driving vehicle includes updating a probability for a decision system used for providing the autonomous driving control, wherein updating the probability is based on the identified type of communication represented by the second visual communication signal.

10. A non-transitory machine-readable medium having instructions stored therein, which when executed by a processor coupled to a first autonomous vehicle, cause the processor to perform operations, the operations comprising:
    determining an initial driving maneuver for the first autonomous driving vehicle in response to the first autonomous driving vehicle perceiving a second vehicle;
    initiating a first visual communication signal provided by the first autonomous driving vehicle, wherein the first visual communication signal represents the initial driving maneuver;
    detecting a second visual communication signal provided by the second vehicle in response to the first visual communication signal, including emitting light according to a predetermined lighting pattern using a lighting mechanism mounted on the second vehicle in response to the first visual communication signal, the predetermined lighting pattern representing; the second visual communication signal;
    identifying a type of communication represented by the second visual communication signal based on the predetermined lighting pattern; and
    determining a subsequent driving maneuver for the first autonomous driving vehicle based on the identified type of communication represented by the second visual communication signal.

11. The medium of claim 10, wherein the first and second visual communication signals are provided by a lighting mechanism of the first and second vehicles respectively.

12. The medium of claim 10, wherein the identified type of communication represented by the second visual communication signal is a driving maneuver for the second vehicle, wherein the second vehicle is a second autonomous driving vehicle.

13. The medium of claim 12, wherein determining the subsequent driving maneuver for the first autonomous driving vehicle includes modifying the initial driving maneuver.

14. The medium of claim 10, wherein the identified type of communication represented by the second visual communication signal is an acknowledgement of the first visual communication signal.

15. The medium of claim 14, wherein determining the subsequent driving maneuver for the first autonomous driving vehicle includes maintaining the initial driving maneuver for the first autonomous driving vehicle.

16. The medium of claim 14, further comprising initiating, in response to the second visual communication signal being identified as an acknowledgement, a third visual communication signal provided by the first autonomous driving vehicle, wherein the third visual communication signal represents a confirmation that the subsequent driving maneuver will conform to the initial driving maneuver.

17. An autonomous driving control system, comprising:
    a processor; and
    a memory coupled to the processor to store instructions, which when executed by the processor, cause the processor to perform operations, the operations including
        determining an initial driving maneuver for a first autonomous driving vehicle in response to the first autonomous driving vehicle perceiving a second vehicle;

initiating a first visual communication signal provided by the first autonomous driving vehicle, wherein the first visual communication signal represents the initial driving maneuver;

detecting a second visual communication signal provided by the second vehicle in response to the first visual communication signal, including emitting light according to a predetermined lighting pattern using a lighting mechanism mounted on the second vehicle in response to the first visual communication signal, the predetermined lighting pattern representing the second visual communication signal;

identifying a type of communication represented by the second visual communication signal based on the predetermined lighting pattern; and determining a subsequent driving maneuver for the first autonomous driving vehicle based on the identified type of communication represented by the second visual communication signal.

18. The system of claim 17, wherein the first and second visual communication signals are provided by a lighting mechanism of the first and second vehicles respectively.

19. The system of claim 17, wherein the identified type of communication represented by the second visual communication signal is a driving maneuver for the second vehicle, wherein the second vehicle is a second autonomous driving vehicle.

20. The system of claim 19, wherein determining the subsequent driving maneuver for the first autonomous driving vehicle includes modifying the initial driving maneuver.

* * * * *